US009795241B2

(12) United States Patent
Tosdale et al.

(10) Patent No.: US 9,795,241 B2
(45) Date of Patent: Oct. 24, 2017

(54) FOOD PANS AND RELATED SYSTEMS

(75) Inventors: David R. Tosdale, Manitowoc, WI (US); Theresa M. Mayer, Sheboygan, WI (US)

(73) Assignee: The Vollrath Company, L.L.C., Sheboygan, WI (US)

( * ) Notice: Subject to any disclaimer, the term of this patent is extended or adjusted under 35 U.S.C. 154(b) by 1458 days.

(21) Appl. No.: 12/562,890

(22) Filed: Sep. 18, 2009

(65) Prior Publication Data

US 2010/0071567 A1 Mar. 25, 2010

Related U.S. Application Data

(60) Provisional application No. 61/099,525, filed on Sep. 23, 2008.

(51) Int. Cl.
*A47J 39/00* (2006.01)
*B65D 1/34* (2006.01)
*A47J 27/16* (2006.01)

(52) U.S. Cl.
CPC .................................... *A47J 27/16* (2013.01)

(58) Field of Classification Search
CPC ...... A47J 27/16; A47J 37/0623; A47J 39/006; A47J 37/0629; A47G 19/065; B65D 1/36; B65D 1/34
USPC ........................................................... 99/448
See application file for complete search history.

(56) References Cited

U.S. PATENT DOCUMENTS

| | | | | |
|---|---|---|---|---|
| 64,905 A | * | 5/1867 | Perry et al. | 99/448 |
| 149,700 A | * | 4/1874 | Wood | 99/448 |
| 255,706 A | * | 3/1882 | Vuillier | 220/23.2 |
| 436,883 A | * | 9/1890 | Wagandt | 72/348 |
| 1,061,769 A | | 5/1913 | Meinecke | |
| 1,239,218 A | * | 9/1917 | Richards | 126/39 R |
| D102,362 S | * | 12/1936 | Friedman et al. | D7/354 |
| 2,231,615 A | * | 2/1941 | Ducke | 126/211 |
| 2,352,684 A | | 7/1944 | Braddock | |
| D156,184 S | * | 11/1949 | Ulmer | D7/357 |
| 2,700,284 A | * | 1/1955 | Lyon, Jr. | 220/23.8 |
| D208,566 S | * | 9/1967 | Lawler | D7/545 |
| 3,344,974 A | * | 10/1967 | Bostrom | 229/123.1 |
| 3,476,282 A | * | 11/1969 | Foster et al. | 220/592.28 |
| 3,498,494 A | * | 3/1970 | Voorhees, Jr. | 206/501 |
| 3,532,247 A | * | 10/1970 | Bridges | 220/23.6 |

(Continued)

FOREIGN PATENT DOCUMENTS

| | | |
|---|---|---|
| CN | 2126682 | 2/1993 |
| CN | 201091500 | 7/2008 |
| WO | WO 2007/043154 A1 | 4/2007 |

OTHER PUBLICATIONS

International Search Report for PCT/US2009/057442, dated Mar. 22, 2010, 5 pages.

(Continued)

*Primary Examiner* — Eric Stapleton
(74) *Attorney, Agent, or Firm* — Foley & Lardner LLP

(57) ABSTRACT

A food pan is for use with food service equipment having a well. The food pan includes a receptacle and an outer rim surrounding the receptacle. The receptacle is designed to receive food, and has a periphery of a first shape. The outer rim has a periphery of a second shape, and supports the food pan on food service equipment. The receptacle extends into the well of the food service equipment.

16 Claims, 13 Drawing Sheets

(56) References Cited

U.S. PATENT DOCUMENTS

D220,749 S * 5/1971 Artz .................. B65D 25/2882 D9/761
3,657,776 A * 4/1972 Herbold ....................... 220/23.8
D225,364 S * 12/1972 Antoni .................. A47G 19/06 D7/553.6
4,113,095 A * 9/1978 Dietz et al. .................. 206/508
D262,931 S * 2/1982 LeVan ........................... D7/505
4,351,164 A 9/1982 Christiani
4,616,762 A * 10/1986 Alexander .................... 220/658
4,660,734 A * 4/1987 Heaney et al. ............... 220/657
D291,526 S * 8/1987 Heaney et al. ................ D7/354
4,744,597 A * 5/1988 Bauman et al. .............. 294/172
D296,404 S * 6/1988 Lowenbein ................. D7/553.1
D298,900 S * 12/1988 Blum et al. .................... D7/505
4,794,228 A 12/1988 Braun, Jr.
4,828,112 A 5/1989 Vollrath et al.
D309,846 S 8/1990 Pozzi
5,035,327 A 7/1991 Denzin et al.
D323,959 S * 2/1992 Ciampi et al. ................. D7/699
5,119,800 A 6/1992 Roberts et al.
5,131,708 A * 7/1992 Denzin ......................... 294/168
D333,944 S * 3/1993 Denzin et al. .............. D7/396.1
5,203,257 A 4/1993 Goad
D342,806 S 12/1993 Jones et al.
D347,058 S * 5/1994 Valentine ..................... D24/123
5,335,787 A * 8/1994 Finchum et al. ............. 206/564
5,492,533 A 2/1996 Kriesel
5,511,467 A * 4/1996 Motley et al. .................. 99/426
D373,053 S * 8/1996 Allegre .......................... D7/587
D379,301 S * 5/1997 Lippincott ..................... D9/761
D382,440 S 8/1997 Fonville
D383,943 S * 9/1997 Boley ........................... D7/555
5,676,276 A * 10/1997 Zielinski et al. ............. 220/657
D387,272 S * 12/1997 Lippincott ..................... D9/761
5,699,784 A * 12/1997 Tippmann et al. ............. 126/33
5,756,968 A 5/1998 Chung
5,762,226 A 6/1998 Baltus et al.
D395,824 S * 7/1998 Durliat .......................... D9/430
D407,948 S * 4/1999 Indekeu ...................... D7/553.3
D408,686 S * 4/1999 Lillelund et al. ........... D7/554.2
D413,209 S 8/1999 Jarke
D415,656 S * 10/1999 Henry ........................... D7/545
5,992,406 A * 11/1999 Lelle .............................. 126/33
D417,361 S * 12/1999 Mittmann et al. .......... D7/396.1
6,021,914 A 2/2000 Schmidt
6,041,715 A 3/2000 Jarke et al.
D422,836 S * 4/2000 Mittmann ...................... D7/354
D427,482 S * 7/2000 Mittmann ...................... D7/354
D430,458 S 9/2000 Kellermann
D431,148 S * 9/2000 Mittmann ...................... D7/354
D431,421 S 10/2000 Liu
D432,409 S 10/2000 Feldmeier
D435,390 S * 12/2000 Mittmann ...................... D7/354
D436,854 S 1/2001 Feldmeier
6,199,715 B1 3/2001 Hayes et al.
D442,484 S 5/2001 Maxwell et al.
D443,173 S * 6/2001 Danielsen et al. ............. D7/354
D445,632 S 7/2001 Bradley
D446,993 S * 8/2001 Zank ............................. D7/354
D446,994 S * 8/2001 Zank ............................. D7/354
D449,205 S * 10/2001 Zank ............................. D7/354
D451,018 S 11/2001 Chen et al.
6,349,843 B1 * 2/2002 Mittmann et al. ......... 220/573.4
D454,751 S * 3/2002 Zank ............................. D7/354
6,415,945 B1 * 7/2002 Zank et al. .................. 220/657
D463,977 S * 10/2002 Castellanos et al. .......... D9/761
D472,428 S 4/2003 Massaloux et al.
D473,757 S * 4/2003 Schwartz .................... D7/553.8
D474,687 S * 5/2003 Jones et al. .................... D9/761
6,557,720 B2 * 5/2003 Tosdale et al. ............... 220/657
6,568,534 B2 * 5/2003 Zank ............................ 206/508
6,607,091 B2 * 8/2003 Gasbarro .................. 220/573.1
6,653,602 B2 * 11/2003 Li ................................ 219/432
D487,672 S 3/2004 Cote et al.
6,705,210 B2 * 3/2004 Leonard ......................... 99/413
D490,656 S 6/2004 Levien
D501,760 S * 2/2005 Bukowski .................. D7/550.1
6,866,832 B2 3/2005 Garwood
D530,625 S * 10/2006 Darin ............................ D9/761
7,163,120 B1 1/2007 Blucher
D541,591 S 5/2007 Wasserman et al.
7,288,745 B2 10/2007 Colonna
D554,531 S * 11/2007 Lovett ........................... D9/737
D557,413 S * 12/2007 Buermann .................. D24/123
D562,078 S 2/2008 Herssein
D562,639 S * 2/2008 Ablo ............................. D7/566
7,347,327 B2 * 3/2008 Lobman et al. .............. 206/518
D565,905 S 4/2008 Valderrama et al.
D573,407 S * 7/2008 Cox ........................... D7/553.1
D573,408 S 7/2008 Lovett
D573,412 S * 7/2008 Ablo ............................. D7/566
D574,179 S * 8/2008 DeLuca ........................ D7/354
D575,077 S 8/2008 Kessels
D584,108 S 1/2009 Olsson
D592,458 S 5/2009 Scherer
D595,094 S 6/2009 Vernes et al.
7,552,840 B2 * 6/2009 Gitschlag et al. ............ 220/575
D608,633 S 1/2010 Elmerhaus
D613,108 S 4/2010 Tosdale et al.
D613,955 S 4/2010 Kho et al.
D618,954 S 7/2010 Antoun et al.
D618,955 S 7/2010 Antoun et al.
D618,956 S 7/2010 Antoun et al.
D620,306 S 7/2010 Tosdale et al.
D623,020 S 9/2010 De Bretton Gordon
D623,021 S 9/2010 De Bretton Gordon
D623,479 S 9/2010 De Bretton Gordon
D625,959 S 10/2010 Deming
D630,045 S 1/2011 Antoun et al.
D630,046 S 1/2011 Antoun et al.
D630,047 S 1/2011 Antoun et al.
D633,754 S 3/2011 Benson
D640,895 S 7/2011 Tosdale et al.
D641,590 S 7/2011 Koennecke
D653,085 S 1/2012 Swallow
D656,778 S 4/2012 Bolgert
2005/0161453 A1 7/2005 Corrieri
2005/0235838 A1 * 10/2005 Cohn ............................. 99/426
2006/0201938 A1 * 9/2006 Wojcik et al. ................ 219/761
2006/0288997 A1 * 12/2006 Griffin ........................... 126/33
2007/0062958 A1 * 3/2007 Kelly ........................... 220/575
2007/0079822 A1 4/2007 Pickens et al.
2007/0090118 A1 4/2007 Milkowski et al.
2007/0221651 A1 * 9/2007 Kristina et al. ............... 219/432
2008/0169294 A1 * 7/2008 Liebzeit ..................... 220/573.1
2008/0185390 A1 8/2008 Liebzeit

OTHER PUBLICATIONS

Vollrath® Setting the Standard™ Smallwares & Light Equipment 2006-2007, 25 pages.

Chinese office action (and its English translation) for corresponding Chinese Application No. 200980141649.2 dated Apr. 22, 2013, 23 pages.

* cited by examiner

FOOD PANS AND RELATED SYSTEMS

CROSS-REFERENCE TO RELATED PATENT APPLICATIONS

This application claims the benefit of U.S. Provisional Application No. 61/099,525, filed Sep. 23, 2008. U.S. Provisional Application 61/099,525 is incorporated herein by reference in its entirety.

BACKGROUND

The present invention relates generally to the field of food pans. More specifically, the present invention relates to metal food pans, such as those used with food service equipment or platforms.

A metal food pan holds food and other items on the food service equipment, as may be found in a buffet-style serving area of a restaurant. The food pan rests on the food service equipment, with the underside of the pan positioned in an opening of the food service equipment. Temperature of food in the pan is controlled by steam or cooled air (or other heating or cooling sources) within the table, where heat is transferred through the bottom of the pan to the food. Because the food pan is not permanently fastened to the food service equipment, other food pans may be filled and stored elsewhere and then used to quickly replace the food pan on the food service equipment to serve additional food. The food is then served from the food pans by the consumer or an employee using utensils.

SUMMARY

One embodiment of the invention relates to a food pan for use with food service equipment having a well. The food pan includes a receptacle and an outer rim surrounding the receptacle. The receptacle is designed to receive food and has a periphery of a first shape. The outer rim has a periphery of a second shape and supports the food pan on the food service equipment. The receptacle extends into the well of the food service equipment.

Another embodiment of the invention relates to a food pan system for food service equipment. The food pan system includes a first receptacle and a second receptacle, both receptacles having non-rectangular peripheries. Each receptacle includes at least one curved side wall, where the curved side walls share a common curvature. When the curved side walls are adjacent to each other, the receptacles are coupled and have a combined outer periphery having four straight sides.

Yet another embodiment of the invention relates to a food pan. The food pan includes a rim, a receptacle, a ledge, and an interference portion. The rim has a periphery that includes four straight sides joined by four corners. The receptacle has a periphery that includes fewer than four straight sides. The ledge extends between the receptacle and the rim. The interference portion extends vertically below the rim and is designed to contact an inside surface of a well of food service equipment in order to limit rotation of the food pan relative to the food service equipment.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
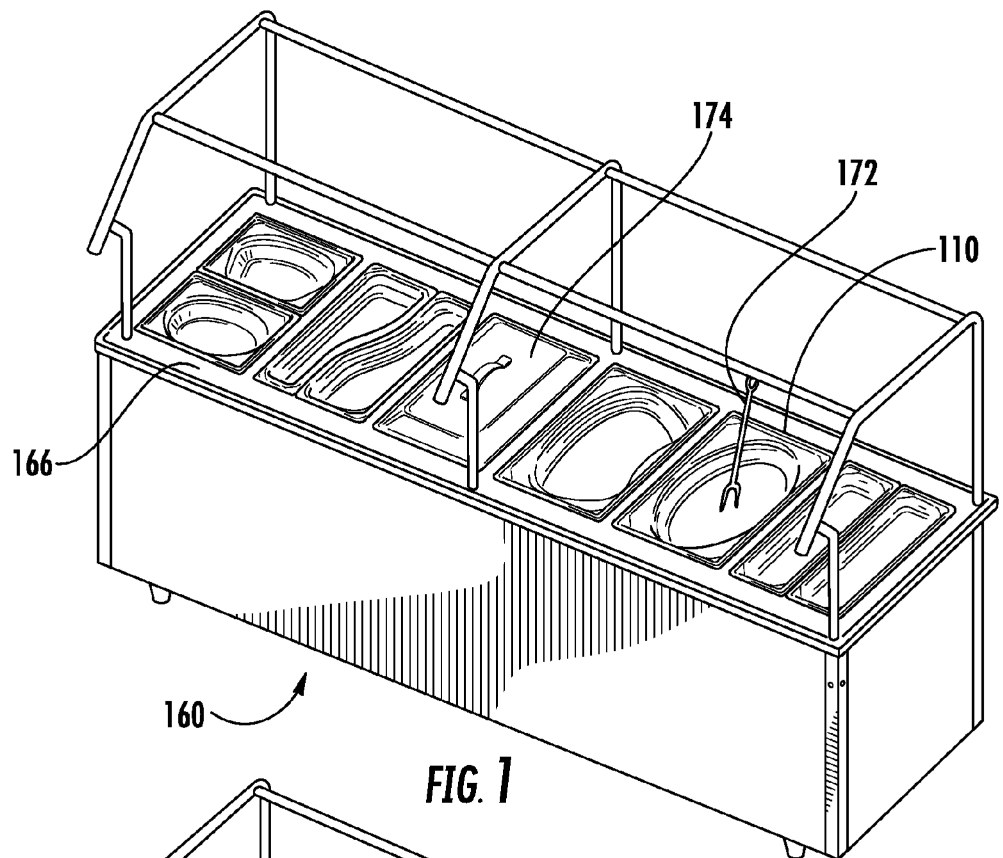
FIG. 1 is a perspective view of food service equipment according to an exemplary embodiment.
Figure 2:
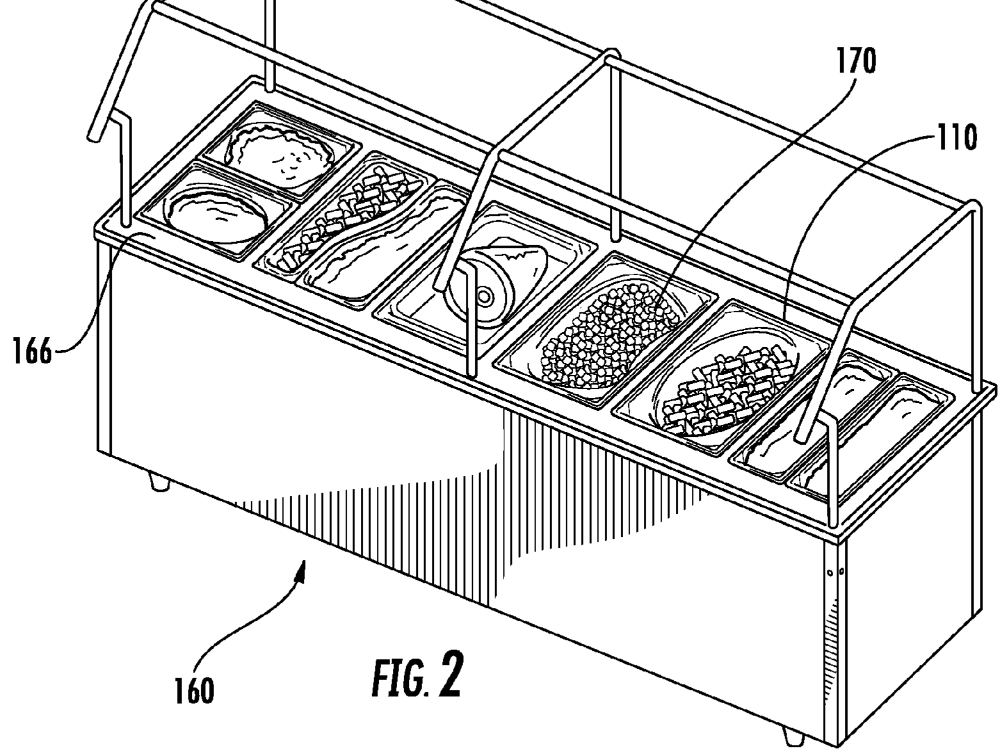
FIG. 2 is a perspective view of food service equipment according to another exemplary embodiment.
Figure 3:
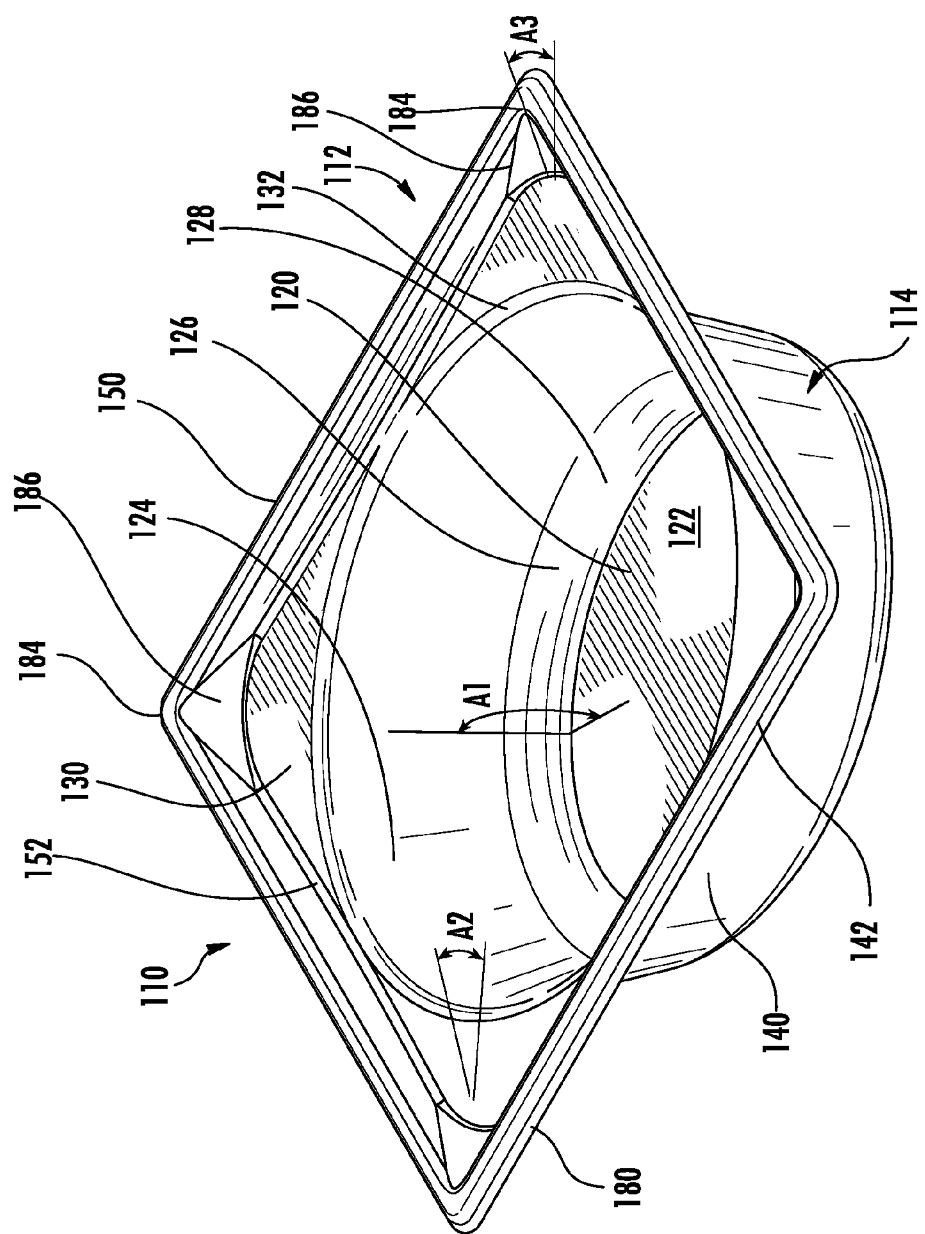
FIG. 3 is a perspective view of a food pan according to an exemplary embodiment.
Figure 4:
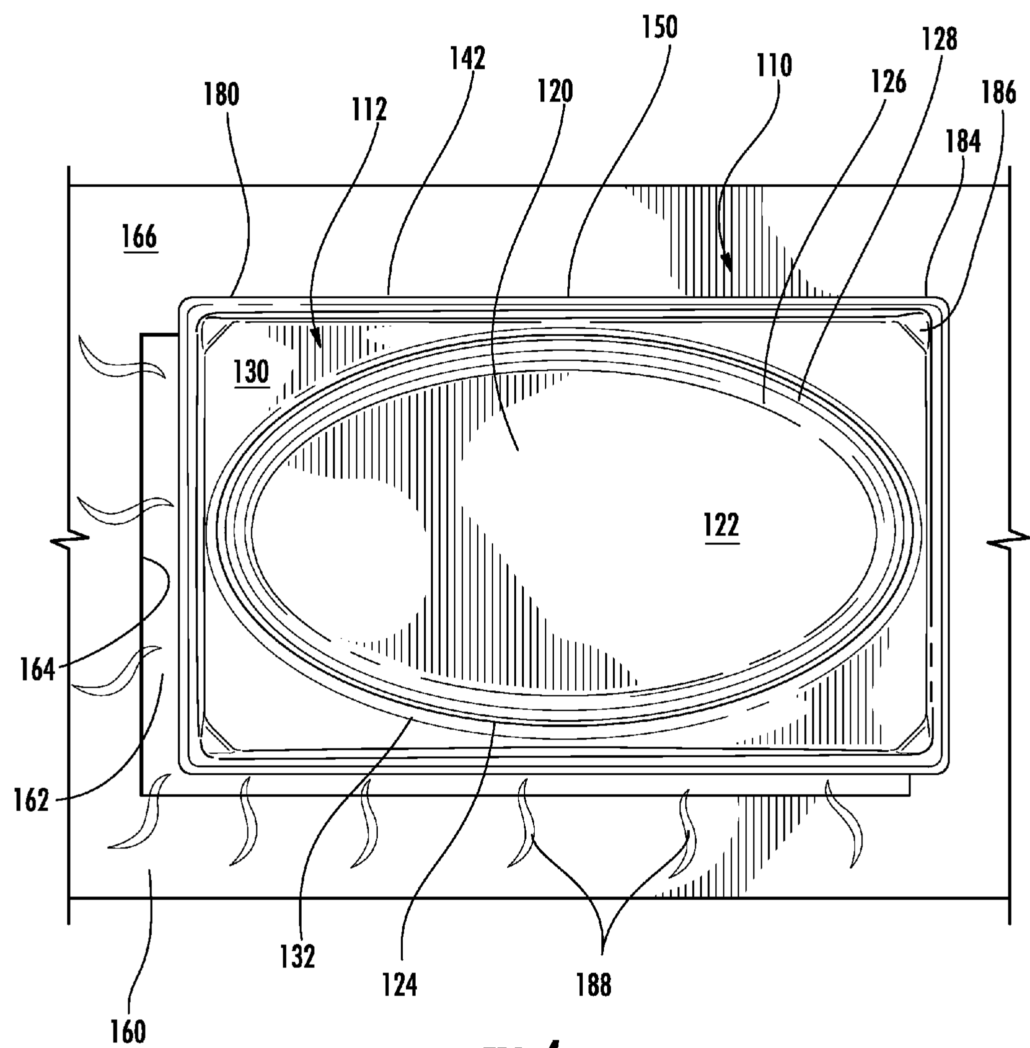
FIG. 4 is a top view of the food pan of FIG. 3.
Figure 5:
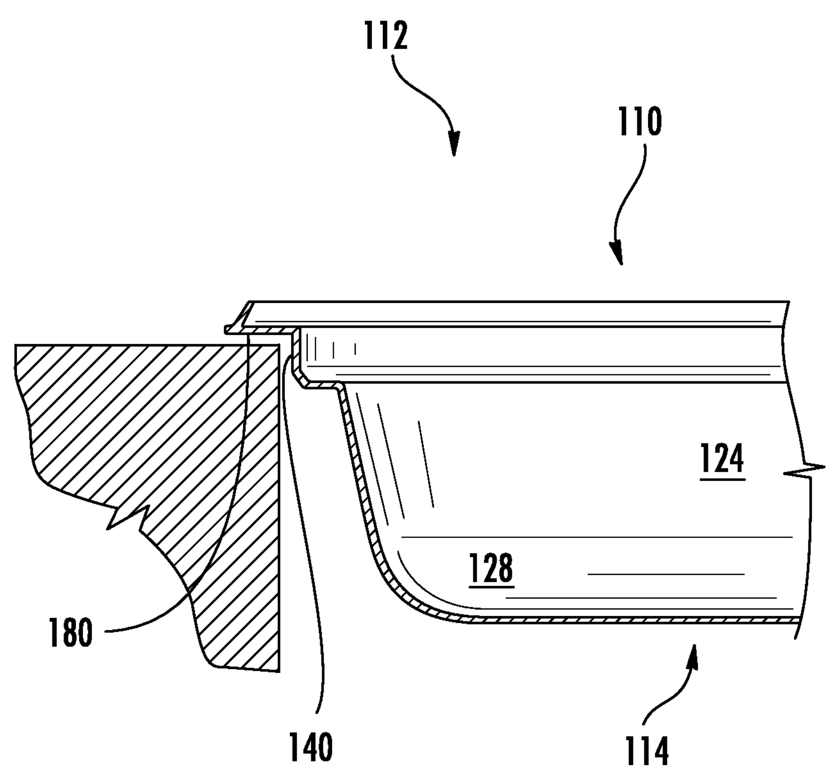
FIG. 5 is an exploded sectional side view of a portion of the food pan of FIG. 3.

Referring to FIGS. 1-2 a food pan 110 is used with a food service platform or food service equipment 160. The food pan 110 may be covered with a cover 174 (e.g., slotted or solid cover, lid, etc.) and may contain food and other items 170 (i.e., contents), along with utensils 172 for serving. For example, the food pan 110 as shown in FIG. 1 is empty, while the food pan 110 as shown in FIG. 2 holds the food items 170. In some embodiments, the items 170 include meats, vegetables, towels, sauces, desserts, or other items. In other embodiments, the food pan 110 may be used with other equipment or platforms in heated or refrigerated buffet lines, steam tables warmers, chafers, marmites, countertops, display cases, heated/cooled shelves, etc., or alone. FIGS. 3-5 show the food pan 110 from various perspectives, with and without the food service equipment 160.

Referring to FIGS. 1-3, the food pan 110 includes a rim 150 surrounding a receptacle 120, and a ledge 130 (e.g., shelf, tier, flat portion, etc.) that connects the receptacle 120 to the rim 150. The receptacle 120 serves as a basin or storage vessel, holding the food items 170. In some embodiments, the ledge 130 supports the receptacle 120 by coupling the receptacle 120 to the rim 150, which rests upon a top surface of the food service equipment 160. There are typical industry standards for well openings of food service equipment 160, and according to an exemplary embodiment, the food pan 110 is designed to sit within such an opening 164 (e.g., a 19⅞×11⅞ inch rectangular opening, about 20×12 inches) in the top surface of the food service equipment 160, with an underside 114 of food pan 110 extending into a well 162. Alternatively, the food pan may be sized to fit within any of a variety of sizes of openings.

The food pan 110 also includes an interference portion 140 (e.g., catch, fitting, contact, guide portion, etc.) to guide the insertion of the food pan 110 into the food service equipment 160 and to inhibit rotation of the food pan 110 relative to the food service equipment 160. The interference portion 140 of the food pan 110 is a wall that surrounds the receptacle 120, and extends substantially vertically. Depending upon the shape, the interference portion 140 provides one or more points of interference or contact (or potential contact) between the food pan 110 and the well 162. For example, the food pan 110 shown in FIG. 3 provides four points of contact.

According to an exemplary embodiment, the food pan 110 is a full-size food pan, such as 20¼×12¹³⁄₁₆ inch pan area, with a 2 to 4 inch pan height and a 4.8 quart brimful capacity. In other embodiments, the food pan is a ½-size, ⅓-size, or other size pans. Some embodiments include full-size pans with dimensions of 20×12 inches or greater, or with brimful capacities of greater than 4 quarts, such as 4.5 quarts or more. Other embodiments include ½-size pans with dimensions of 10×12 inches or greater. Alternatively, the food pan 110 may be configured to provide any of a variety of sizes.

Referring to FIG. 4, the food pan 110 may be heated or cooled by a heating or cooling source located in the equipment, or otherwise in communication with the food pan 110. Heat may be transferred through walls (e.g., the underside 114) of the food pan 110 or from above to control the temperature of the food items 170 in the food pan 110. Some exemplary heating and cooling sources include hot steam, radiated heat energy (e.g., flame, heating lamp), ice water bath, refrigerated air, dry ice, and others. Accordingly, when the food pan 110 is resting in well 162, the food items 170 in the receptacle 120 may be heated or cooled through the walls while the food items 170 remain accessible via a top side 112 of the food pan 110. In FIG. 4, the food pan 110 is not yet within the well 162, and heat 188 is escaping from the well 162.

Referring to FIGS. 3-4, a periphery 126 of the receptacle 120 is shaped differently from a periphery 142 of the rim 150 (and the well opening 164 of the food service equipment 160). According to an exemplary embodiment, the periphery 126 of the receptacle 120 is elliptical (e.g., oval), while the periphery 142 of the rim 150 (and well opening 164) is rectangular. The ledge 130 extends between the receptacle 120 and the rim 150, connecting the elliptical periphery 126 to the rectangular periphery 142. The walls of the interference portion 140 serve to limit sliding and rotation of the food pan 110 in the rectangular opening 164 of the food service equipment 160, such as when food is being loaded into or scooped out of the food pan 110. Accordingly, the receptacle 120 of the food pan 110 may be provided in a wide variety of non-rectangular shapes, while the food pan 110 still fits securely into the rectangular opening 164 of the food service equipment 160 due to engagement between the interference portion 140 and the well 162. In some embodiments, the non-rectangular shape of the receptacle 120 may be designed to conveniently locate the items 170 of the food pan 110, to provide a unique food display, or to prevent the utensils 172 from falling completely into the food items 170.

Referring specifically to the receptacle 120 shown in FIGS. 1-5, the receptacle 120 is located in the center of the food pan 110, and includes a bottom 122 and a wall 124. According to an exemplary embodiment, the bottom 122 defines a flat, horizontal plane when the food pan 110 is resting in the well 162. An angle A1 may be defined between the surfaces of the wall 124 and the bottom 122. In some embodiments, the angle A1 may be about ninety degrees, such that the wall 124 is perpendicular or near-perpendicular to bottom 122. In other embodiments, the angle A1 may be greater than ninety degrees, such that the wall 124 slopes into the bottom 122 (e.g., to provide a draft such as 4 to 13 degrees).

In some embodiments, a pan may include a ramp in place of a flat bottom (see, e.g., FIGS. 1-2). In other embodiments, a bottom of a food pan receptacle may be arcuate, waved, partitioned into regions of flat and slanted surfaces, segmented into sections by ridges, or otherwise shaped. Different bottom designs may affect the strength of the bottom, heat transfer properties, and the aesthetic design. For example, ridges may provide resting or guide points for utensils 172.

Referring to FIGS. 1-5, the wall 124 connects to the bottom 122 at a corner 128 (e.g., a joint), which may be rounded. The rounded corner 128 between the bottom 122 and the wall 124 of the receptacle 120 allows for serving utensils 172 being slid along the bottom 122 to easily transition sliding momentum into the upward direction along the wall 124 of the receptacle 120. Further, the rounded corner 128 provides for convenient access to the corner 128 for cleaning or polishing the food pan 110. According to another embodiment, a pan includes a corner with a straight incline between the wall and the bottom. Still other embodiments have an L-shaped corner.

Referring particularly to FIG. 3, the ledge 130 and the interference portion 140 are shown from the top side 112 of the food pan 110, where the ledge 130 extends in a recess 152 below the rim 150. The recess 152 helps to prevent spilling and leaking by directing food items 170 toward the receptacle 120. In some embodiments, the ledge 130 has an incline angle A2 relative to a horizontal plane, where the incline provides a gradient directed toward the receptacle 120. For example, A2 may range from 0 to 15 degrees, such as about 5 degrees. The gradient guides liquids or other items 170 that may drip or fall onto the ledge 130. Other embodiments include a ledge having curvature, such as a concave or convex surface. The ledge 130 connects to the interference portion 140 at a corner 132, which may also be rounded.

Referring to FIG. 4, the interference portion 140 serves as a brace, anchoring the food pan 110 within the food service equipment 160. The interference portion 140 is designed such that the interference portion 140 fits in close proximity or in contact with the border of an industry-standard food service equipment well opening 164. The rim 150 of the food pan 110 rests on a top surface 166 of the food service equipment well 162 and the interference portion 140 extends into the well 162, below the top surface 166. When the food pan 110 is resting in the well 162, contact with the interference portion 140 restricts sliding and rotation of food pan 110. According to an exemplary embodiment, the interference portion 140 extends a distance greater than 0.125 inches below the outside, top surface 166 of the well 162 when the food pan 110 is placed in the food service equipment 160. In some embodiments, the interference portion 140 extends a distance less than between 0.75 inches below the outside, top surface 166 of the well 162 when the food pan 110 is placed in the food service equipment 160.

Referring again to FIG. 3, the rim 150 of the food pan 110 connects to the interference portion 140 and includes a flange 180 extending along the rim 150 of the food pan 110. The rim 150 is sized to cover the opening 164 in the surface of the well 162 of the food service equipment 160, to create a seal with the surface of the food service equipment 160. The flange 180 along the rim 150 provides a reinforcement structure within the rim 150, where hard use of the food pan 110, such as by accidental dropping and banging, will be less likely to deform the rim 150.

In some embodiments, the rim 150 of the food pan 110 includes four straight edges joined together by four corners 184, with each straight edge perpendicular to the adjacent edges and parallel to the opposite straight edge (i.e., a rectangular periphery). The ledge 130 connects to the rim 150 in each corner 184 through a ramp 186. In some embodiments, each ramp 186 includes an incline angle A3 above horizontal, where A3 may range from about 3 to 45 degrees, such as about 10 degrees. In other embodiments, A3 is greater than 45 degrees. The ramp 186 serves as a pour spout to guide items from the receptacle 120 in the event of pouring, as well as a structural reinforcement for the rim 150. Also, the ramp 186 may assist lifting of the food pan 110 from well 162, by providing a surface for the food pan 110 to slide against the well opening 164. Pulling the ramp 186 horizontally lifts the food pan 110 vertically, which may break a suction seal between the food pan 110 and the well 162. Vertically lifting the food pan 110 allows a user to insert fingers, washcloths, or serving utensils 172 underneath the rim 150 to gain a grip on the food pan 110 for lifting. Additionally, the ramp 186 allows for easier cleaning access to the rim corners 184.

According to an exemplary embodiment, the food pan 110 may be formed from a metal sheet or roll, such as a 22-gauge stainless steel sheet. An exemplary process for forming the food pan 110 includes providing an individual sheet or a roll of metal, sheering or cutting a desired size blank, conducting a first draw of the blank, annealing the metal, conducting a second draw, trimming and deburring the food pan 110, washing and packaging the food pan 110. In some embodiments, the steel sheet is formed into the food pan 110 via a stamping process. In other embodiments, the steel sheet is manipulated via drawing, cutting, rolling, and other metal-working processes. Still other embodiments include food pans formed from plastic, ceramic, or a composite, where the materials are formed into food pans via molding processes. Other exemplary embodiments include some, but not all of these steps or processes.

Figure 6:
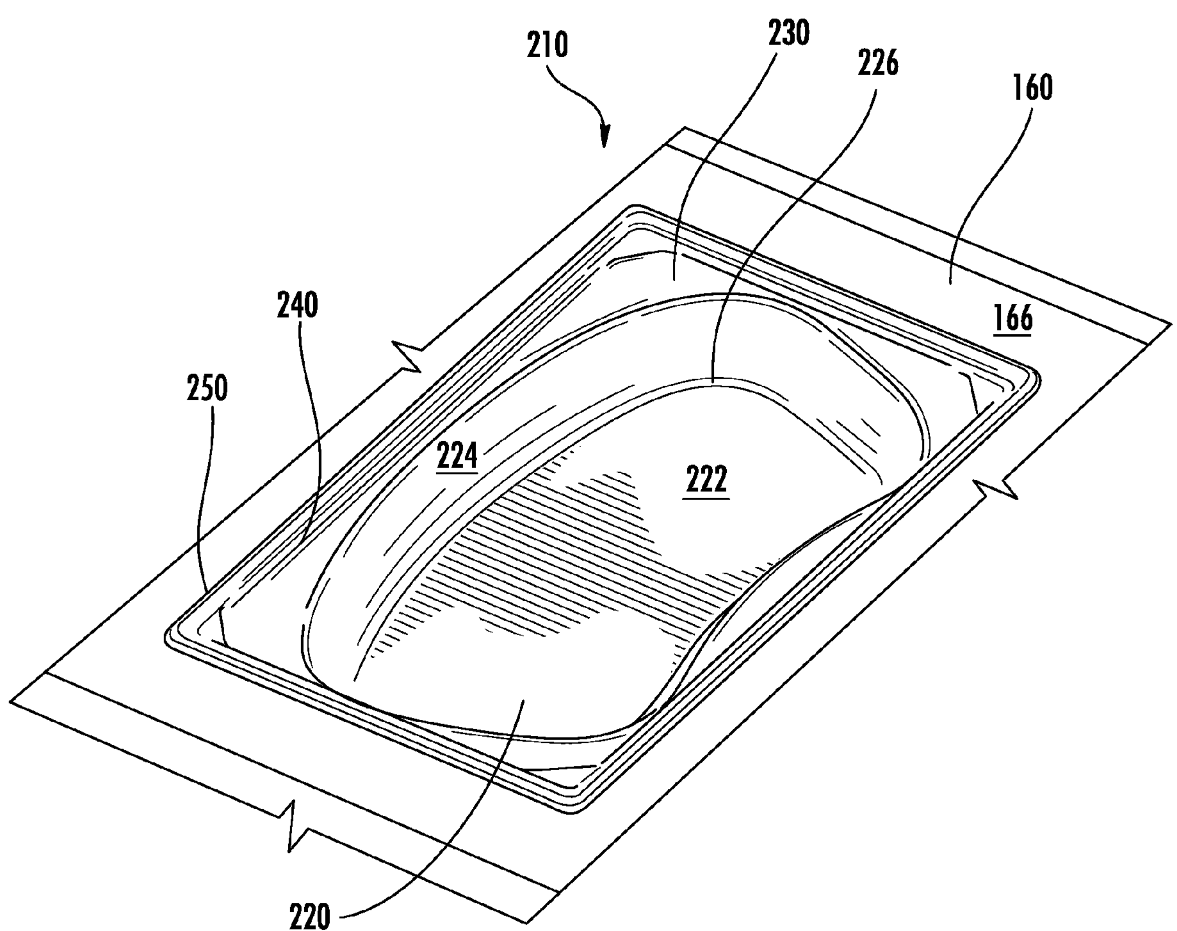
FIG. 6 is a perspective view of a food pan on food service equipment according to an exemplary embodiment.
Figure 7:
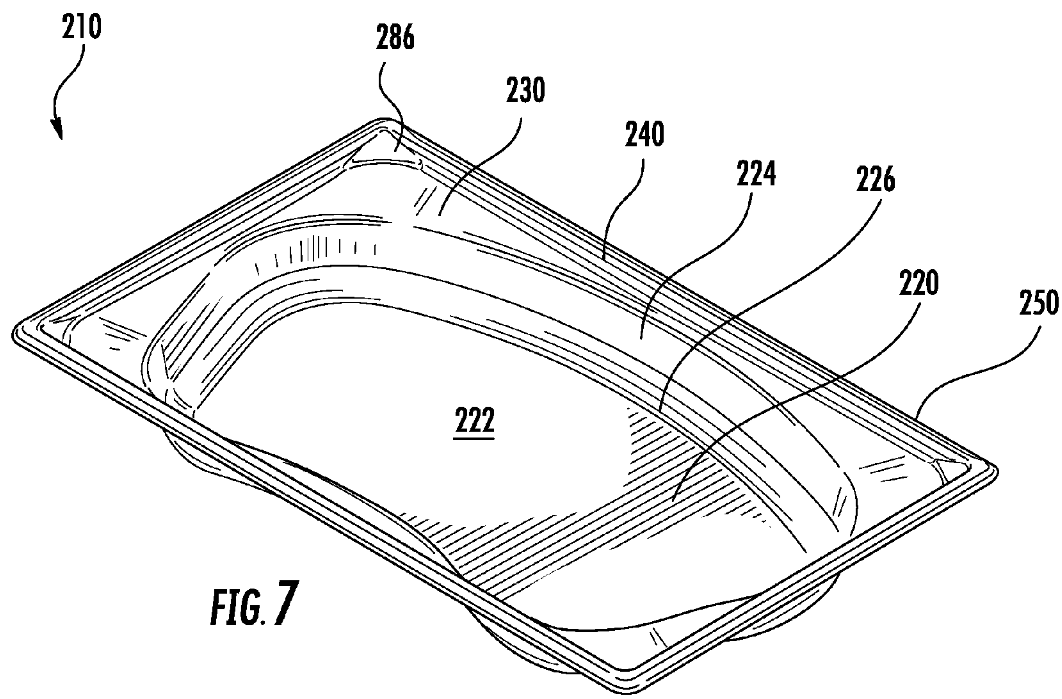
FIG. 7 is a perspective view of a food pan according to an exemplary embodiment.
Figure 8:
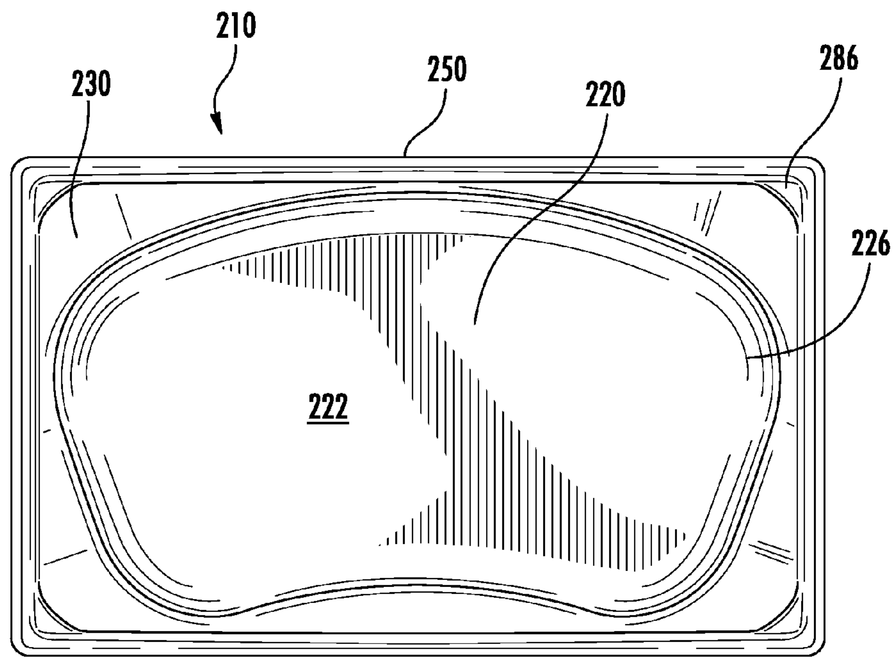
FIG. 8 is a top view of the food pan of FIG. 7.

Referring to FIGS. 6-8, a pan 210 includes a rectangular rim 250 and a receptacle 220 with a periphery 226 that is curved (e.g., kidney bean shaped). The receptacle 220 includes a bottom 222 surrounded by walls 224, where the bottom 222 and walls 224 hold food items of the pan 210. The pan 210 is designed to fit into the top surface 166 of the food service equipment 160, as shown in FIG. 1. Extending from the walls 224 of the receptacle 220, the pan 210 further includes a ledge 230 that connects the receptacle to the rectangular rim 250. The ledge 230 is recessed from the rim 250 such that a wall 240 between the ledge 230 and the rim 250 serves as an interference portion of the pan 210, holding the pan within a well of the food service equipment 160. In some embodiments, the pan 210 also includes pour spouts 286 in the corners of the rim 250, as shown in FIGS. 7-8. The shape of the receptacle 220 may assist scooping of food items from the pan 210, especially food items that would otherwise become trapped in a sharper rectangular corner. Additionally, the rounded walls 224 of the receptacle 220, which corresponds to ends of the kidney bean shape, may help to hold serving utensils in place, reducing the likelihood that the utensils will fall into the items of the pan 210. According to an exemplary embodiment, the size of the pan 210 matches the size of the food pan 110, allowing the pans 110, 210 to be used interchangeably in the food service equipment 160. The volumes of the respective receptacles 120, 220 may differ.

Figure 9:
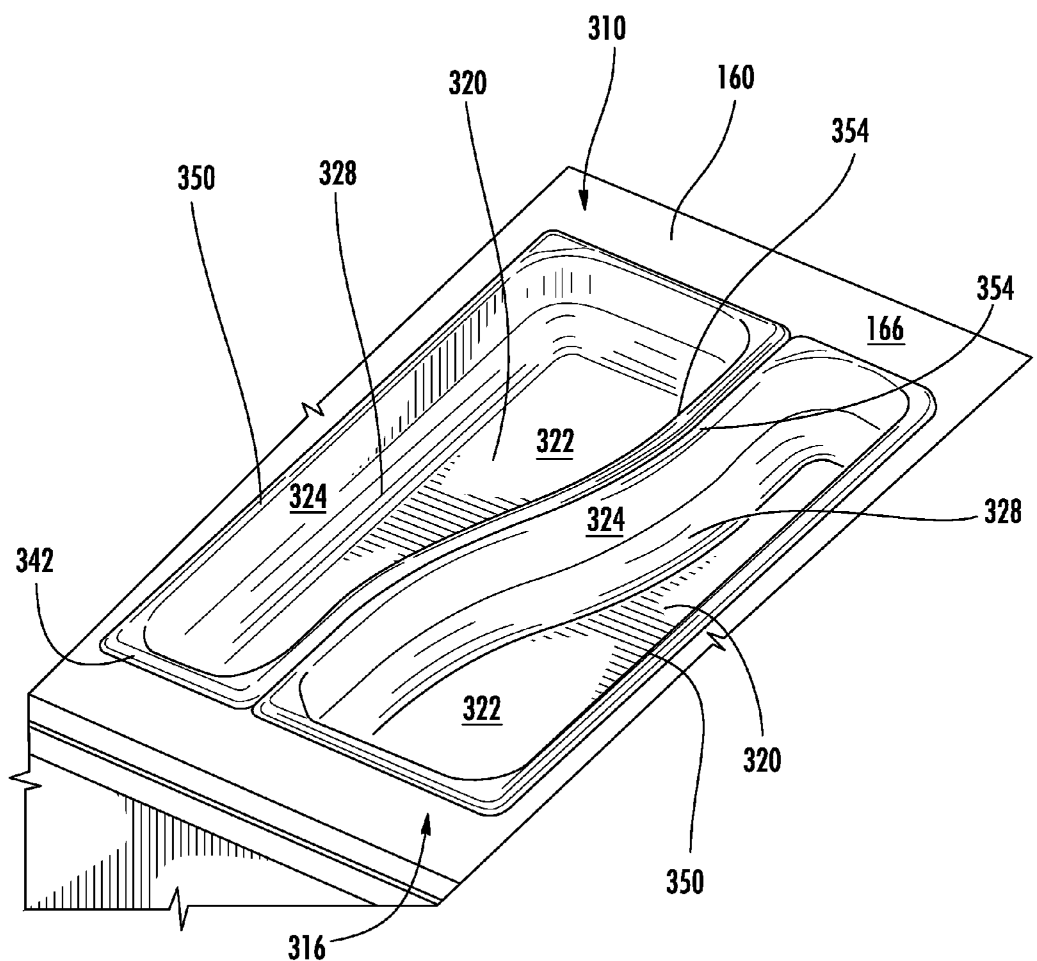
FIG. 9 is a perspective view of food pans on food service equipment according to another exemplary embodiment.
Figure 10:
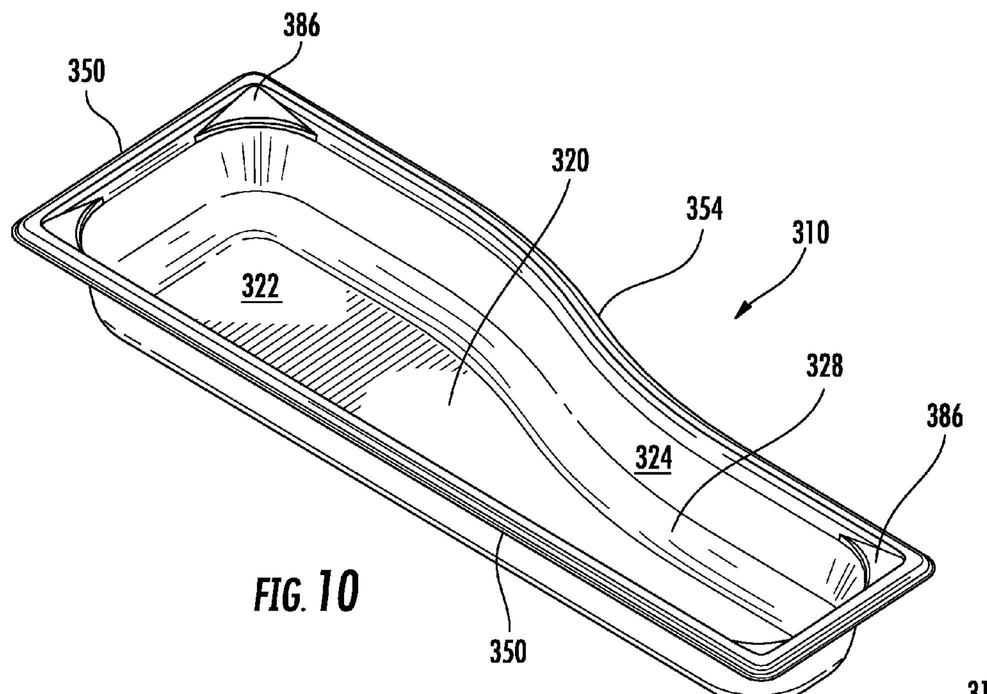
FIG. 10 is a perspective view of a food pan according to yet another exemplary embodiment.
Figure 11:
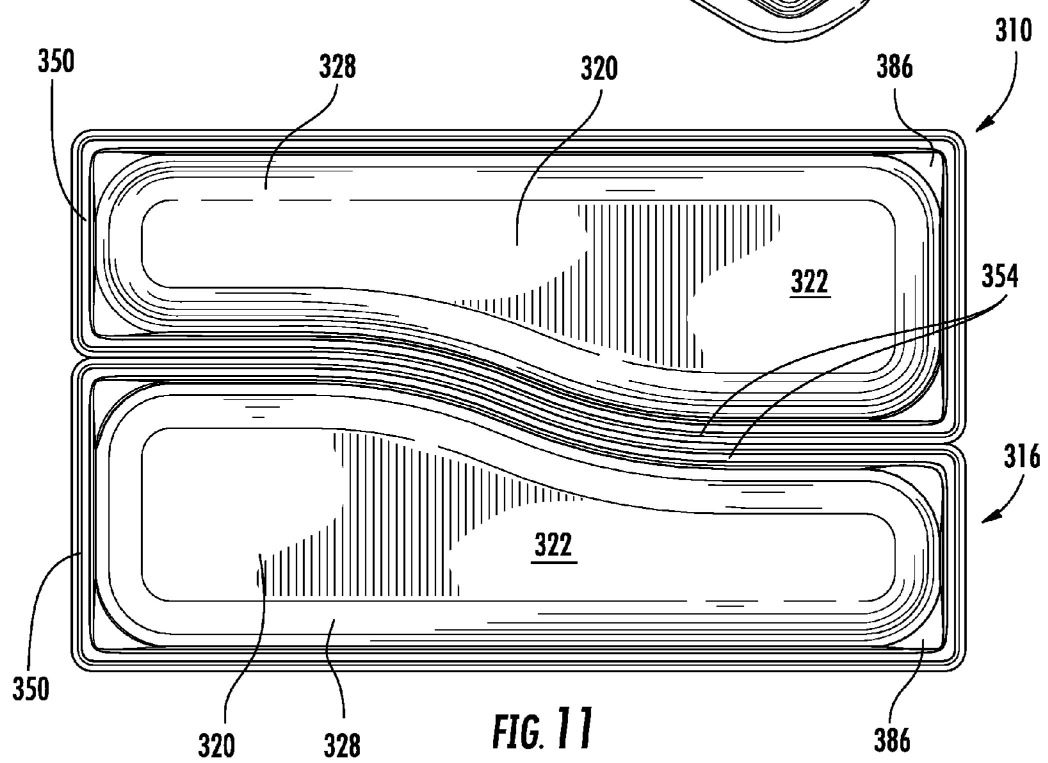
FIG. 11 is a bottom view of food pans according to an exemplary embodiment.

Referring to FIGS. 9-11, two food pans 310, 316 include mating rims 350, where the combined shape of the food pans 310, 316, when the mating rims 350 are together, forms a rectangular periphery 342 that is designed to fit into a standard steam table well or food service equipment opening. Each of the food pans 310, 316 includes a receptacle 320 having a non-rectangular shape. The receptacle 320 includes a bottom 322 and side walls 324, which connect to the bottom 322 along a rounded corner 328. The side walls 324 connect to the rim 350. In other embodiments, side walls connect to a ledge, which connects to a rim. One side of the pans 310, 316 includes a mating surface in the form of a curved edge 354. The curved edge 354 is designed to engage with an inversely curved edge of another pan. For example, the curved edges 354 of the pans 310, 316 may be oriented so that the curved edges 354 contact each other. According to at least one embodiment, the pans 310, 316 may be arranged in a complementary geometric configuration (e.g., a yin-yang arrangement), where one pan 310 serves as a first receptacle and the other (identical) pan 316 serves as a second receptacle. Together in a rectangular well of the food service equipment 160, the rims 350 of the food pans 310, 316 interlock, reducing relative sliding of the pans 310, 316. In some embodiments, the pans 310, 316 include pour spouts 386. In certain embodiments, the curvature of mating pan edge 354 is designed to be used for an aesthetic design sequence within the well 162 or on the food service equipment 160. In some embodiments an adapter bar or adapter piece (not shown) may be used to fill in space between pans on food service equipment 160. For example, if the pans are not sized to completely fill the well 162, the adapter bar may fill in the gap, creating a seal. The adapter bars may be placed between pans, or between pans and an edge of the well 162.

Figure 12:
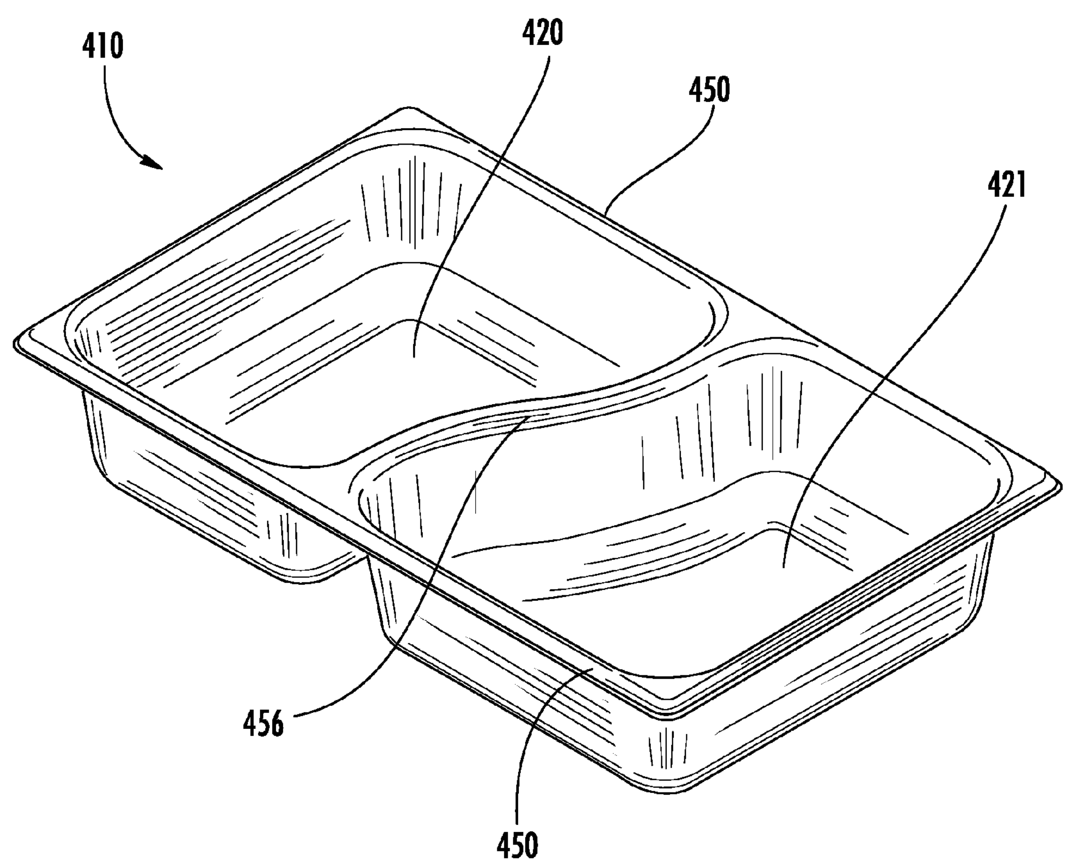
FIG. 12 is a perspective view of a food pan according to another exemplary embodiment.

Referring to FIG. 12, a pan 410 includes two receptacles 420, 421 of non-rectangular shapes. The pan 410 further includes a rim 450 designed to fit over a rectangular food service equipment well. The receptacles 420, 421 are separated by a curved wall 456. As shown in the embodiment of FIG. 12, the curved wall 456 divides the pan 410 into the two receptacles 420, 421 forming a yin-yang pattern. Other embodiments include other numbers of receptacles in a single pan. In such embodiments, the receptacles are divided by at least one curved wall, making the receptacles into non-rectangular shapes. However, the pans include an outer rim of a rectangular shape, allowing the pan to fit into food service equipment 160.

Figure 13:
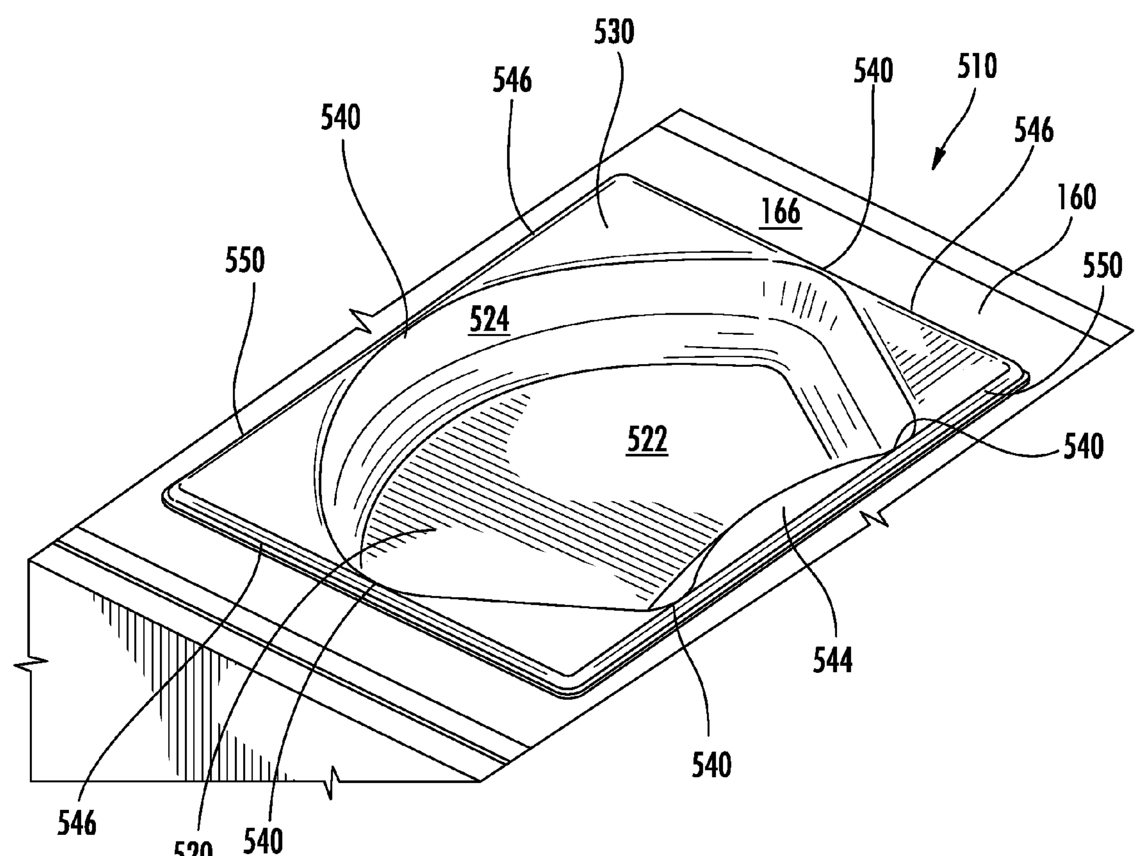
FIG. 13 is a perspective view of a food pan on food service equipment according to yet another exemplary embodiment.
Figure 14:
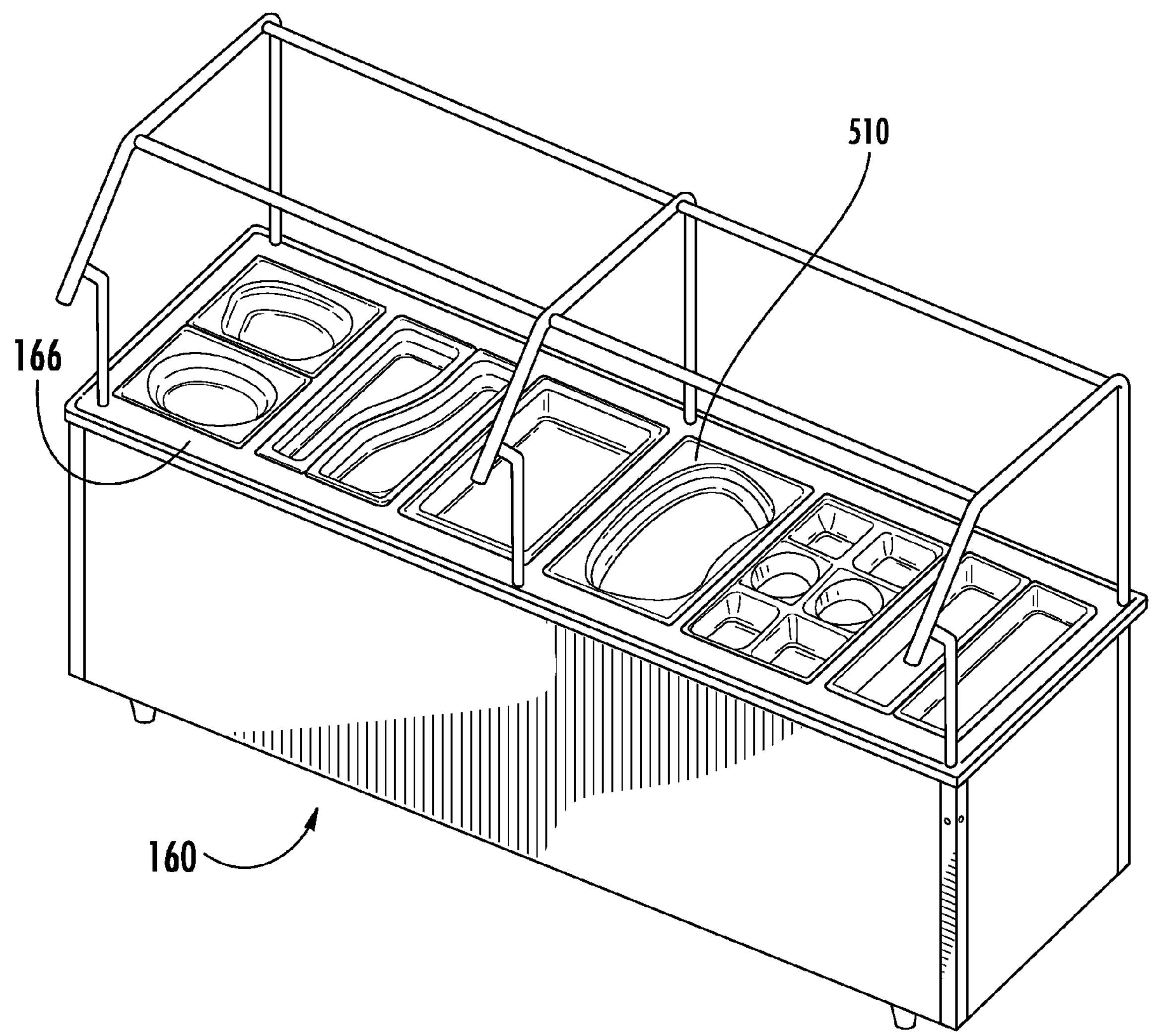
FIG. 14 is a perspective view of food service equipment according to yet another exemplary embodiment.

Referring to FIGS. 13-14, a pan 510 includes a bean-shaped receptacle 520, with a bottom 522 and side walls 524. The side walls 524 are attached to a ledge 530, which connects to a rectangular rim 550. The ledge 530 is located at the level of the rim 550. An interference portion of the pan 510 is formed from contact portions 540 on the outside of the side walls 524 of the receptacle 520 (e.g., corners of the bean), which are designed to contact the inside surface of a food service equipment well 162. According to an exemplary embodiment, at least one side 544 of the pan 510 includes two contact portions 540, and each of the other sides 546 include at least one contact portion 540. As with the interference portion 140 of the food pan 110, the contact portions 540 are designed to limit sliding and rotation of the pan 510. In another embodiment, at least one side includes an elongate section designed to contact the inside surface of the food service equipment well 162, in place of the two contact portions 540. In yet another embodiment, single contact portions are positioned in each of the four corners of a pan.

Figure 15:
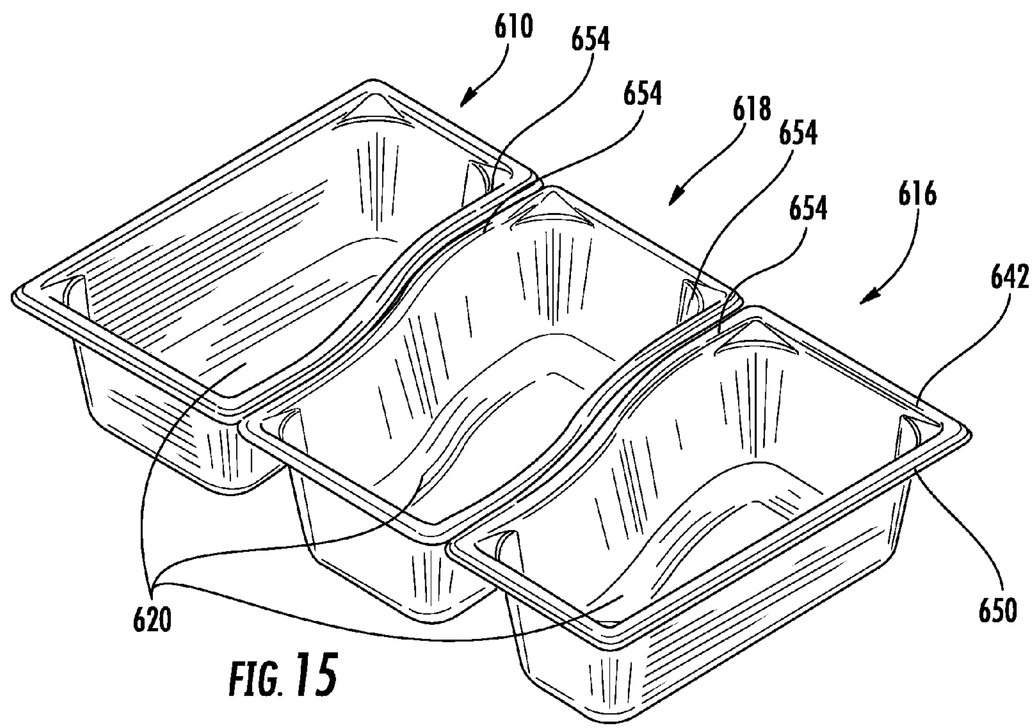
FIG. 15 is a perspective view of food pans according to another exemplary embodiment.
Figure 16:
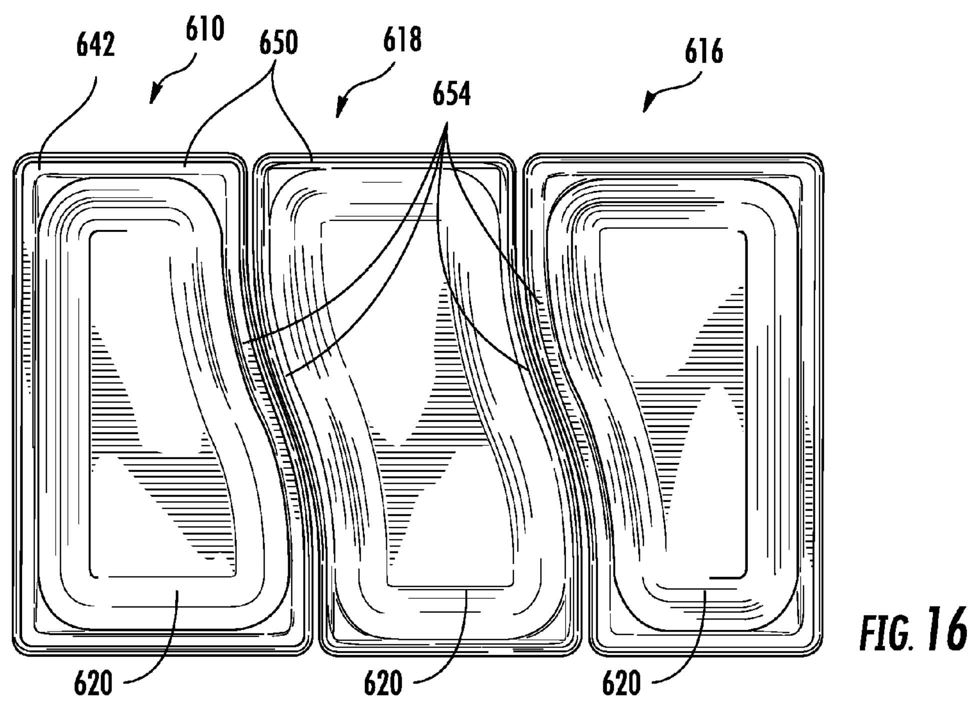
FIG. 16 is a top view of the food pans of FIG. 15.

Referring to FIGS. 15-16, three ⅓-size pans 610, 618, 616 may be arranged to fill an opening in the food service equipment 160. The pans 610, 618, 616 include rims 650 that fit together, and non-rectangular receptacles 620. When the pans 610, 618, 616 are arranged, as shown in FIGS. 15-16, the outside periphery 642 of the pans 610, 618, 616 forms a rectangular shape and all three of the pans 610, 618, 616 fit together within the rectangular opening 164 of the food service equipment 160. The outer pans 610, 616 have identical shapes, but are oriented differently. While the center pan 618 has two curved sides 654, each curved side 654 designed to couple with a curved side on the outer pans 610, 616. The outer pans 610, 616 may be coupled together, similar to the pans 310, 316 shown in FIGS. 9-11. However, without the pan 618 between the pans 610, 616, the pans 610, 616 only fill two-thirds of the food service equipment well 162.

Figure 17:
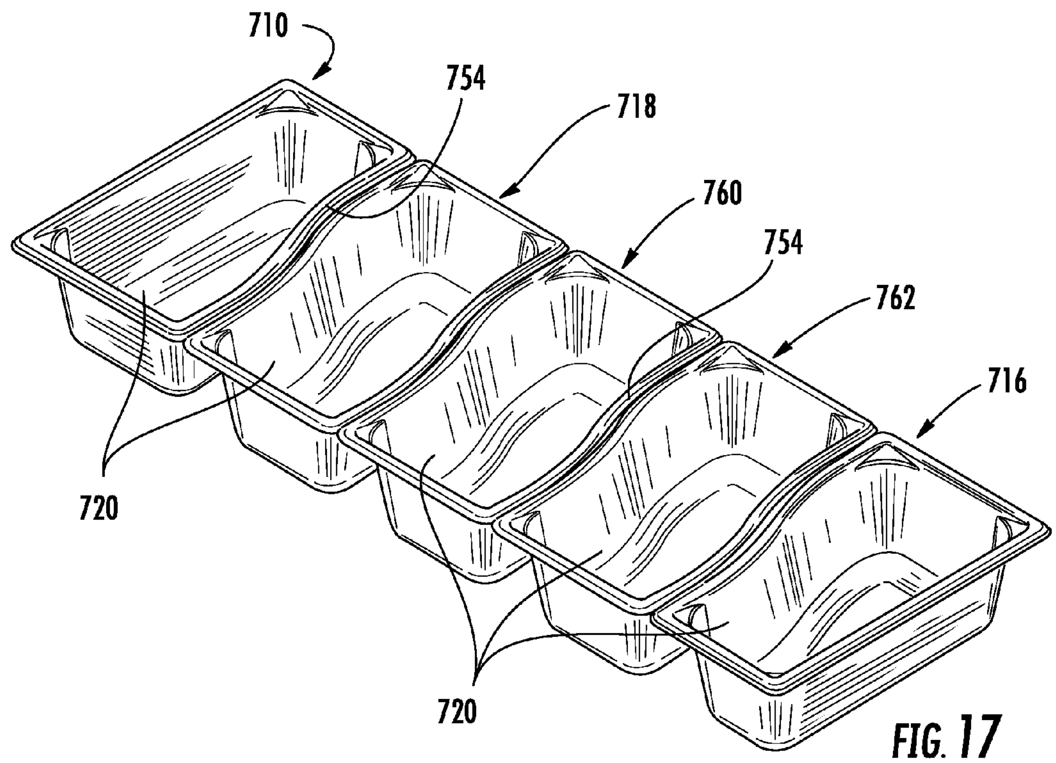
FIG. 17 is a perspective view of food pans according to yet another exemplary embodiment.

Referring to FIG. 17, several pans 710, 718, 760, 762, 716 (e.g., gelato serving pans) may be arranged together to fill an opening in the food service equipment, such as a rethermalizer or warmer. The pans 710, 718, 760, 762, 716 include rims 754 that fit together, and non-rectangular receptacles 720. When the pans 710, 718, 760, 762, 716 are arranged, as shown in FIG. 17, the outside periphery of the pans 710, 718, 760, 762, 716 forms a rectangular shape and all of the pans 710, 718, 760, 762, 716 fit together within a rectangular opening of the food service equipment. The outer pans 710, 716 have identical shapes, but are oriented differently. While the center pans 718, 760, 762 have two curved sides 754, each curved side 754 designed to couple with a curved side on the outer pans 710, 716, or corresponding curved sides on the center pans 718, 760, 762. The outer pans 710, 716 may be coupled together, similar to the pans 310, 316 shown in FIGS. 9-11. In still other embodiments, more of fewer center pans are used.

Figure 18:
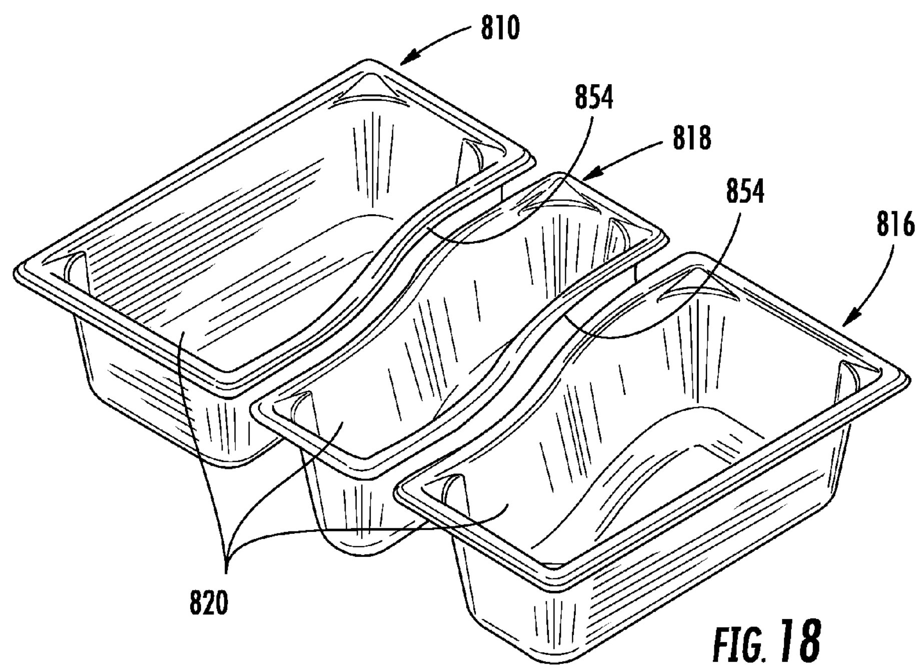
FIG. 18 is a perspective view of food pans according to still another exemplary embodiment.

Referring to FIG. 18, three pans 810, 818, 816 may be arranged to fill an opening in the food service equipment, such as a 4/3-size rethermalizer or warmer. The pans 810, 818, 816 include rims 854 that fit together, and non-rectangular receptacles 820. When the pans 810, 818, 816 are arranged, as shown in FIG. 18, the outside periphery of the pans 810, 818, 816 forms a rectangular shape and all three of the pans 810, 818, 816 fit together within the rectangular opening of the food service equipment. The outer pans 810, 816 have identical shapes, but are oriented differently. While the center pan 818 has two curved sides 854, each curved side 854 designed to couple with a curved side on the outer pans 810, 816. The outer pans 810, 816 may be coupled together, similar to the pans 310, 316 shown in FIGS. 9-11, but with the curve sides 854 extending along a shorter side of the pans 810, 818. Without the pan 818 between the pans 810, 816, the pans 810, 816 fill a full size food service equipment well 162, instead of a 4/3-size food service equipment well.

The construction and arrangements of the food pan, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, some food service platforms may be designed with unusually-shaped well openings (e.g., non-rectangular), and corresponding food pans may have outer peripheries and interference portions designed to match the well openings of such food service platforms. Some combinations of food pans, which together fit a full-size food pan opening in a steam table, may not be equal fractions of a full-size pan, such as a ⅓-size pan that couples to a ⅔-size pan. Some elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A food pan for use with food service equipment having a well, the food pan comprising:
- a receptacle configured to receive food and having a non-rectangular periphery defined by a side wall;
- an outer rim surrounding the receptacle, wherein the outer rim has a rectangular periphery including four straight edges joined together by four corners, each straight edge perpendicular to the adjacent edges and parallel to the opposite straight edge;
- an interference portion comprising a wall extending below the outer rim, wherein the wall surrounds the receptacle and is located between the receptacle and the rectangular periphery of the outer rim; and
- a ledge extending between the receptacle and the wall of the interference portion, wherein the ledge and the wall of the interference portion couple the non-rectangular periphery of the receptacle to the outer rim;
- wherein the outer rim is configured to support the food pan on the food service equipment with the receptacle and the wall of the interference portion extending into the well of the food service equipment;
- wherein the interference portion is configured to contact an inside surface of the well of the food service equipment to limit rotation of the food pan relative to the food service equipment.

2. The food pan of claim 1, wherein the pan is integrally formed from a single sheet of steel.

3. The food pan of claim 1, wherein the ledge is recessed below the outer rim, and wherein the ledge is configured to direct a liquid on the ledge toward the receptacle.

4. The food pan of claim 1, further comprising a ramp located in each corner of the outer rim, and wherein the ramp is formed from a slanted portion of the food pan.

5. The food pan of claim 1, wherein the interference portion comprises at least two contact portions on the side wall configured to contact an inside surface of the well of the food service equipment, limiting rotation and sliding of the food pan when the food pan is coupled to the food service equipment.

6. The food pan of claim 1, wherein the interference portion comprises at least five contact portions on the side wall configured to contact an inside surface of the well of the food service equipment, limiting rotation and sliding of the food pan when the food pan is coupled to the food service equipment.

7. The food pan of claim 1, wherein the non-rectangular periphery of the receptacle is an ellipse shape, a bean shape, or a yin or a yang shape.

8. A food pan system for use with food service equipment having a well, the food pan system comprising:

a first food pan including a receptacle and a rim having a non-rectangular periphery with a first curved edge; and a second food pan including a receptacle and a rim having a non-rectangular periphery with a second curved edge;

wherein with the first curved edge contacting the second curved edge, the food pans have a combined rectangular outer periphery comprising four straight sides.

9. The system of claim 8, wherein the first and second food pans are shaped such that when the first and second food pans are in a first configuration the first and second food pans fit together in a yin-yang arrangement, and when the first and second food pans are in a second configuration the first and second food pans are stacked with the receptacle of the first food pan fitting in the receptacle of the second food pan.

10. The system of claim 9, further comprising a third food pan, the third food pan having at least two curved side walls including a receptacle and a rim having a non-rectangular periphery with a third curved edge and a fourth curved edge opposite the third curved edge and configured to fit between the first and second food pans, wherein with the first curved edge contacting the third curved edge and the second curved edge contacting the fourth curved edge, the first, second, and third food pans have a combined rectangular outer periphery.

11. The system of claim 10, wherein the rims of the first and second food pans have identical shapes and the rim of the third food pan has a different shape.

12. The system of claim 8, wherein the receptacles of the first food pan and the second food pan have identical shapes.

13. The food pan system of claim 8, wherein the first curved edge and the second curved edge are inversely curved with respect to one another.

14. A food pan comprising:

a rim having a periphery with four straight sides joined by four corners;

a receptacle having a periphery with fewer than four straight sides;

a ledge extending between the receptacle and the rim, wherein the ledge is recessed below the rim and configured to direct a liquid on the ledge toward the receptacle; and an interference portion extending vertically below the rim and surrounding the receptacle, wherein the interference portion is configured to contact an inside surface of a well of food service equipment to limit rotation of the food pan relative to the food service equipment.

15. The food pan of claim 14, wherein the interference portion comprises a wall extending below the rim, and wherein the wall is configured to be placed into the well of the food service equipment.

16. The food pan of claim 15, further comprising a ramp located in at least one of the four corners of the rim, and wherein the ramp is formed from a slanted portion of the food pan.

* * * * *